United States Patent
Trochon

(12) United States Patent (10) Patent No.: US 6,772,858 B2
(45) Date of Patent: Aug. 10, 2004

(54) DEVICE FOR ATTENUATING NOISE IN A TUBE FOR TRANSPORTING GAS

(75) Inventor: Eric Trochon, Courbevoie (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 393 days.

(21) Appl. No.: 09/875,144

(22) Filed: Jun. 7, 2001

(65) Prior Publication Data

US 2002/0189897 A1 Dec. 19, 2002

(51) Int. Cl.$^7$ ................................................. E04F 17/04
(52) U.S. Cl. ...................................................... 181/224
(58) Field of Search ................................. 181/224, 226, 181/227, 228, 229, 232, 236, 238, 239, 240, 241, 257, 212, 213

(56) References Cited

U.S. PATENT DOCUMENTS 5,033,581 A * 7/1991 Feuling ....................... 181/257
6,009,705 A * 1/2000 Arnott et al. ................. 60/312

* cited by examiner

*Primary Examiner*—Kimberly Lockett
(74) *Attorney, Agent, or Firm*—Westerman, Hattori, Daniels & Adrian LLP

(57) ABSTRACT

The device for attenuation of noise in a tube intended to transport a gas includes a branch tube having two ends which open into said tube by two connections, and at least one tube referred to as quarter wave tube having a closed end referred to as the free end and another end which is connected to said tube at the level of the connections of the branch tube, thus forming three sections of circulation of gas entering into said tube. The invention can be applied in the field of motor vehicles.

20 Claims, 3 Drawing Sheets

– 1 –

DEVICE FOR ATTENUATING NOISE IN A TUBE FOR TRANSPORTING GAS

The present invention concerns a device for noise attenuation in a tube intended to transport a gas of the type found in motor vehicles.

More specifically, it concerns a device for noise attenuation of exhaust pipes or of air intake conduits.

FIGS. 1a and 1b depict a well-known noise attenuation device commonly referred to as the "quarter wave device", consisting, as is discernible in FIG. 1a, of integrating a closed-end branch 2 to the tube to be treated 1.

This type of device enables realization of significant noise attenuation but only over a narrow frequency interval, as is discernible in FIG. 1b, i.e., between 300 and 380 Hz for a tuning frequency, for example, on the order of 340 Hz (a wavelength to be treated of 1000 mm).

FIGS. 2a and 2b depict another device for noise attenuation, commonly referred to as an "interference tube", consisting, as is discernible in FIG. 2a, of integrating a branch of a second tube 4 with a specific length and diameter to the tube to be treated 3. Such a device advantageously enables treating a noise over a broader frequency interval than that treated by the quarter wave device, however, the attenuation obtained proves not to be very great, as is discernible in FIG. 2b, for the same tuning frequency as above.

An object of the invention is to avoid in particular this type of disadvantage by proposing a device for noise attenuation which is particularly effective over a broad frequency band and which is simple to implement.

To that end, an object of the invention is a device for noise attenuation in a tube intended to transport a gas, characterized in that it consists, on the one hand, of a branch tube of which the two ends open into the tube to be treated, and, on the other, of at least one tube, referred to as quarter wave tube, closed at one of its ends, referred to as the free end, and whose other end is connected to the tube at the level of a connection of the branch tube with said tube, thus forming at least three circulation sections for the gas entering said tube.

When the device according to the invention comprises only one quarter wave tube, it can be connected at the level of one or the other of the connections of the branch tube with said tube.

According to other interesting provisions of the invention:

the length of each section is defined as follows:

$$L2=\lambda-0.85\ D2$$

$$L3=\tfrac{1}{2}\lambda-0.85\ D3$$

$$L4=L5=\tfrac{1}{4}\lambda-0.425\ D4$$

where $\lambda$ is the wavelength to be treated and Dn is the tube diameter of the section n.

the diameters of each of the sections are determined such that they are as close as possible to the diameter of the tube to be treated.

the sections and the tube to be treated all have the same diameter.

the diameter of the sections is determined as follows as a function of the diameter of the tube to be treated:

$$D1=D4=D5$$

$$\text{and } D2=D3=\tfrac{3}{4}D1.$$

the free ends of each of the tubes referred to as quarter wave tubes are connected to each other.

Another object of the invention concerns a gas conduit for a motor vehicle engine of the air intake conduit type, characterized in that it has at least one device for noise attenuation according to the present invention.

The above-mentioned characteristics of the invention, as well as others, will be clarified through the reading of the following description of an embodiment with reference to the annexed figures, wherein:

FIG. 1b depicts a diagram illustrating the attenuation of the device in FIG. 1a;

FIG. 2b depicts a diagram illustrating the attenuation of the device in FIG. 2a;

FIG. 3b depicts a diagram illustrating the attenuation of the device in FIG. 3a;

Figure 1A:
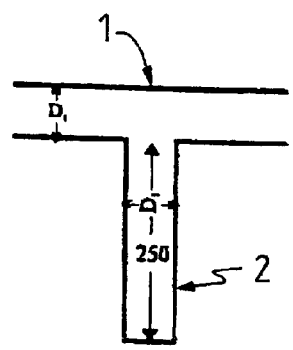
FIG. 1a depicts a prior art attenuation device.
Figure 1B:
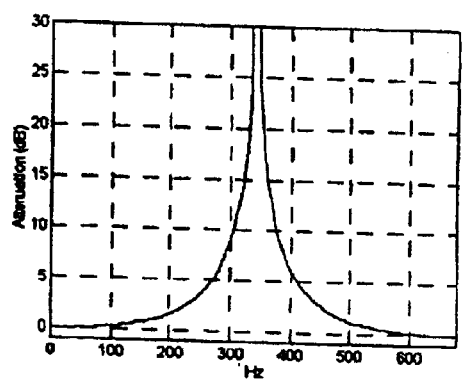
Figure 2A:
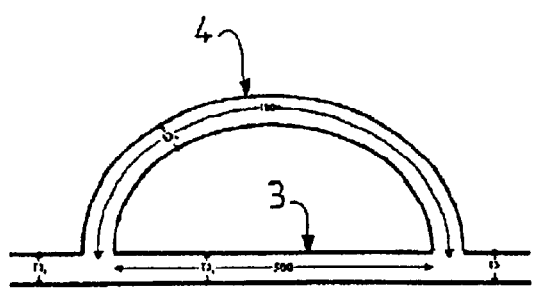
FIG. 2a depicts a different prior art attenuation device.
Figure 2B:
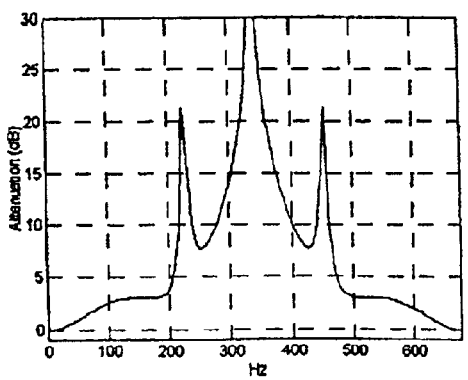
Figure 3A:
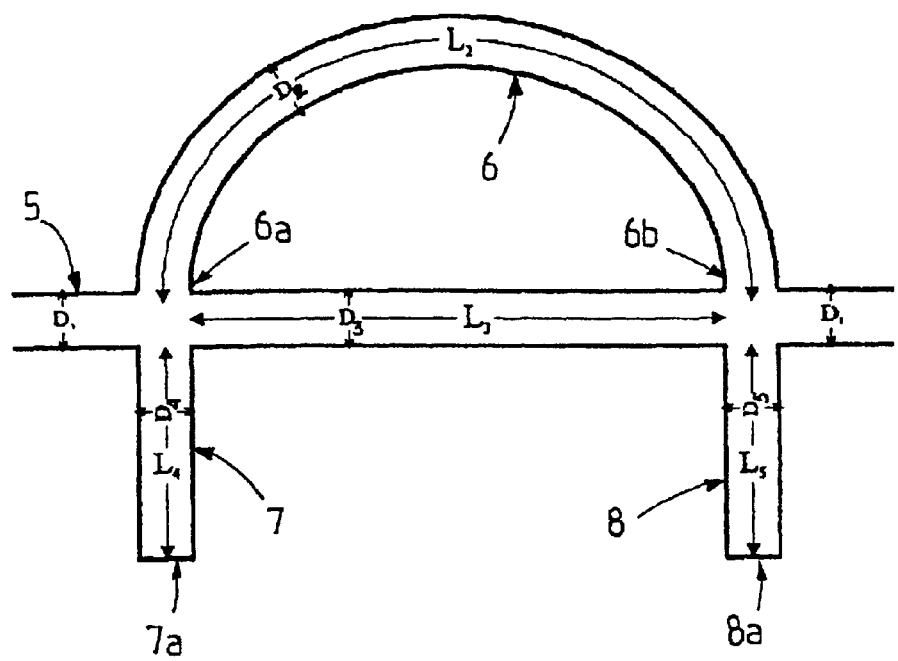
FIG. 3a depicts the attenuation device according to the present invention.
Figure 3B:
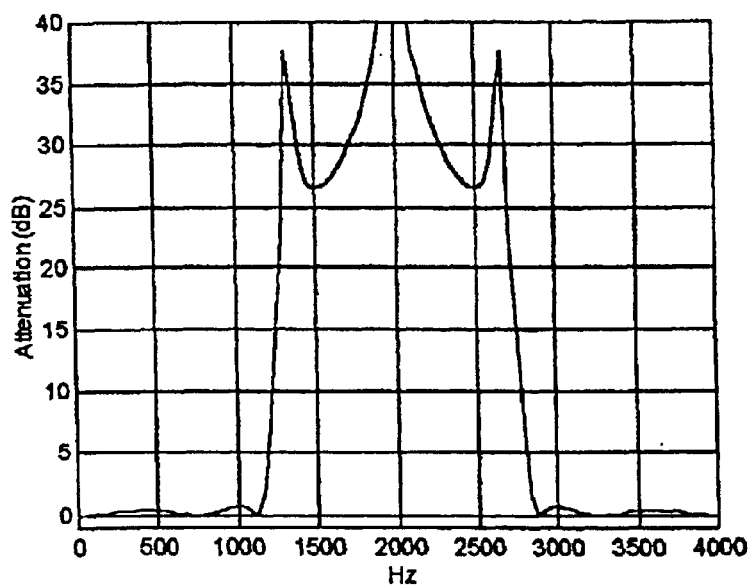

FIGS. 3a and 3b depict a device for noise attenuation in a tube 5 intended to transport a gas according to the present invention which consists, on the one hand, of a branch tube 6 of which the two ends 6a and 6b open into the tube 1 to be treated, and, on the other, of two tubes 7 and 8 of which one of the ends 7a, 8a is closed and of which the other end is connected to the tube 1 at the level of the connections 6a and 6b, respectively, of the branch tube 6, as is more clearly discernible in FIG. 3a, and thus defining the general shape of a letter "A".

It should be noted that the branch tube is classically referred to as an "interference tube" whereas the two tubes 7 and 8 are referred to as "quarter wave" tubes.

The length and the diameter of each of the sections of the device for noise attenuation as described above is determined so as to optimize the attenuation over a broad frequency band.

Thus, advantageously, the dimensioning of the lengths of the sections L2, L3, L4, and L5, discernible in FIG. 3a, is defined as follows:

$$L2=\lambda-0.85\ D2$$

$$L3=\tfrac{1}{2}\lambda-0.85\ D3$$

$$L4=L5=\tfrac{1}{4}\lambda-0.425\ D4$$

where $\lambda$ is the wavelength to be treated and Dn is the tube diameter of the section n.

Likewise, the diameter of each of the sections is advantageously determined such that they are as close as possible to each other.

Such a configuration makes it possible to obtain attenuation with a large bandwidth, for example, between 1000 Hz and 3000 Hz for a tuning frequency of the tubes at 2000 Hz.

According to a variant, the diameters of the sections all have the same dimension.

Advantageously, it should be noted that the noise attenuation is obtained over a broader band when the diameters of the longest sections of the device are reduced relative to the others as follows:

$D1=D4=D5$ and $D2=D3=¾D1$.

The following table presents dimensioning examples and the result obtained for the bandwidth where the noise attenuation is satisfactory:

| | | | |
|---|---|---|---|
| Fc Tuning frequency (Hz) | 340 | 680 | 2000 |
| D diameter of the sections (mm) | 60 | 60 | 36 |
| λ = speed of sound/wavelength (mm) | 1000 | 500 | 200 |
| L2 (mm) | 950 | 140 | 170 |
| L3 (mm) | 450 | 200 | 70 |
| L4 = L5 (mm) | 225 | 100 | 35 |
| Bandwidth (Hz) | 220 460 | 440 910 | 1300 2700 (FIG. 3b) |

Figure 4:
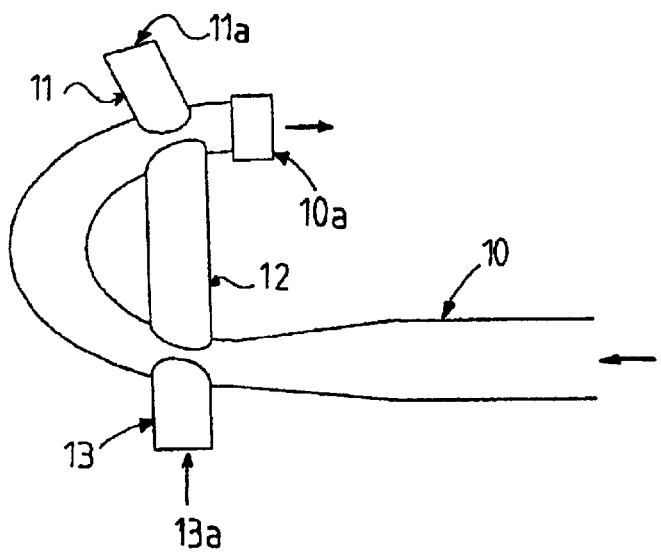
FIG. 4 depicts the attenuation device applied to a conduit connecting a turbocharger of a motor vehicle.

FIG. 4 depicts an application of the attenuation device according to the present invention to the whistling noise of a motor vehicle compressor and, specifically, to a conduit 10 of an air intake of a turbo-charged engine. The compressor to which the conduit 10 is connected by one of its ends 10a gives off a whistling sound which is propagated inside the conduit and is radiated by its walls. The frequency of the whistle changes with the speed of the turbo, thus requiring an attenuation device which functions over a broad band as does the present invention.

To this end, the conduit 10 is provided with three tube sections 11, 12, and 13, respectively, intended to form the attenuation device as described above. Two of these tube sections 11 and 13 are closed at their free ends 11a and 13a.

It should be noted that the two sections 11 and 13 are not, as discernible in FIG. 4, arranged in the same plane.

The attenuation device is adaptable to its environment and can assume very diverse forms.

Figure 6:
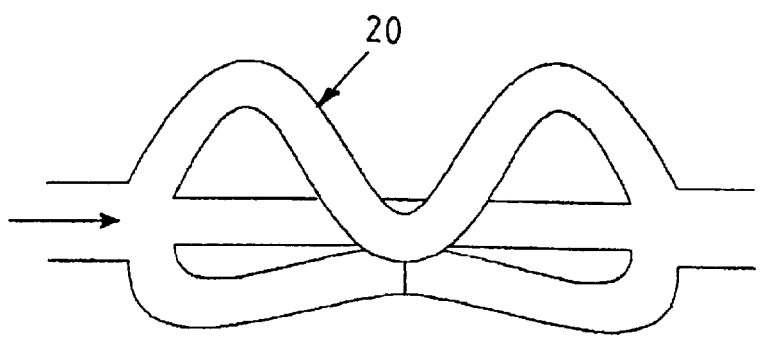
FIG. 6 depicts another variant embodiment of the present invention.

FIG. 6 depicts a possible form of the device where the branch tube 20 has the general shape of a letter "M" and of which the two tubes are welded together at their free closed or obstructed ends. It is, however, important to avoid producing radii of curvature that are too small.

Figure 5:
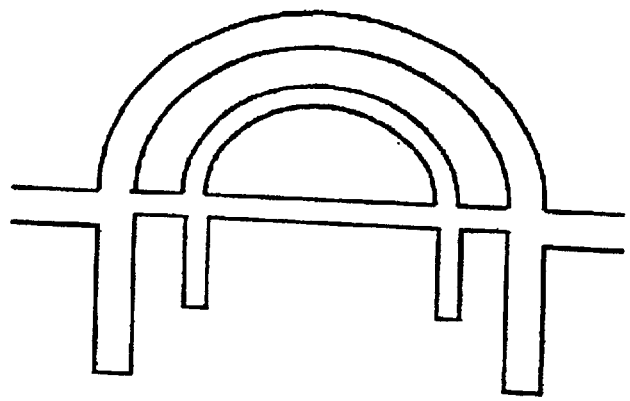
FIG. 5 depicts a variant embodiment of the shape of the device according to the present invention.

A second embodiment is depicted in FIG. 5, where it is shown that it is possible to combine a plurality of devices according to the present invention, advantageously enabling treatment of a broader frequency band.

It is understood from the reading of the above description that the attenuation device according to the invention is effective over a broader frequency band than the various elements which constitute it and that it is very simple to implement.

Although the invention was described in association with a specific embodiment, it includes all the technical equivalents of the means described. To this end, it is understood that the invention also applies in all domains where the noise propagated by a column of gas must be reduced.

What is claimed is:

1. Device for attenuation of noise in a tube intended to transport a gas, comprising a branch tube having two ends which open into said tube by two connections, and at least one tube referred to as quarter wave tube having a closed end referred to as the free end and another end which opens into said tube by a connection at the same location along said tube as one of the connections of the branch tube, thus forming three sections of circulation of gas entering into said tube.

2. Device for attenuation of noise according to claim 1, wherein a length L2 of the branch tube, a length L3 of said tube between the connections of the branch tube, and a length L4 of said at least one quarter wave tube are defined as follows:

$L2=λ-0.85\ D2$ $L3=½λ-0.85\ D3$ $L4=¼λ-0.425\ D4$ wherein λ is the wavelength to be treated, D2 is a diameter of the branch tube, D3 is a diameter of said tube between the connections of the branch tube, and D4 is a diameter of said at least one quarter wave tube.

3. Device for attenuation of noise according to claim 1, wherein a diameter of each of the sections of the branch tube and the quarter wave tube is determined such that it is as close as possible to a diameter of said tube and to a diameter of each of the other tubes.

4. Device for attenuation of noise according to claim 2, wherein a diameter of each of the sections of the branch tube and the quarter wave tube is determined such that it is as close as possible to a diameter of said tube and to a diameter of each of the other tubes.

5. Device for attenuation of noise according to claim 1, wherein the sections and said tube all have the same diameter.

6. Device for attenuation of noise according to claim 2, wherein the sections and said tube all have the same diameter.

7. Device for attenuation of noise according to claim 1, wherein diameters of the sections are determined as a function of a diameter of the tube to be treated as follows:

$D1=D4$ and $D2=D3=¾D1$, wherein D1 is a diameter of said tube outside of the connections of the branch tube, D2 is a diameter of the branch tube, D3 is a diameter of said tube between the connections of the branch tube, and D4 is a diameter of said at least one quarter wave tube.

8. Device for attenuation of noise according to claim 2, wherein diameters of the sections are determined as a function of a diameter of the tube to be treated as follows:

$D1=D4$ and $D2=D3=¾D1$, wherein D1 is a diameter of said tube outside of the connections of the branch tube, D2 is a diameter of the branch tube, D3 is a diameter of said tube between the connections of the branch tube, and D4 is a diameter of said at least one quarter wave tube.

9. Device for attenuation of noise according to claim 1, comprising two quarter wave tubes each having a closed end referred to as the free end and another end which opens into said tube by a connection at the same location along said tube as one or the other of the connections of the branch tube, respectively, thus forming four sections of circulation of gas entering into said tube.

10. Device for attenuation of noise according to claim 2, comprising two quarter wave tubes each having a closed end referred to as the free end and another end which opens into said tube by a connection at the same location along said tube as one or the other of the connections of the branch tube, respectively, thus forming four sections of circulation of gas entering into said tube, wherein said quarter wave tubes have the same length.

11. Device for attenuation of noise according to claim 3, comprising two quarter wave tubes each having a closed end referred to as the free end and another end which opens into said tube by a connection at the same location along said tube as one or the other of the connections of the branch tube, respectively, thus forming four sections of circulation of gas entering into said tube.

12. Device for attenuation of noise according to claim 4, comprising two quarter wave tubes each having a closed end referred to as the free end and another end which opens into said tube by a connection at the same location along said tube as one or the other of the connections of the branch tube, respectively, thus forming four sections of circulation of gas entering into said tube.

13. Device for attenuation of noise according to claim 5, comprising two quarter wave tubes each having a closed end referred to as the free end and another end which opens into said tube by a connection at the same location along said tube as one or the other of the connections of the branch tube, respectively, thus forming four sections of circulation of gas entering into said tube.

14. Device for attenuation of noise according to claim 6, comprising two quarter wave tubes each having a closed end referred to as the free end and another end which opens into said tube by a connection at the same location along said tube as one or the other of the connections of the branch tube, respectively, thus forming four sections of circulation of gas entering into said tube.

15. Device for attenuation of noise according to claim 7, comprising two quarter wave tubes each having a closed end referred to as the free end and another end which opens into said tube by a connection at the same location along said tube as one or the other of the connections of the branch tube, respectively, thus forming four sections of circulation of gas entering into said tube, wherein said quarter wave tubes have the same diameter.

16. Device for attenuation of noise according to claim 8, comprising two quarter wave tubes each having a closed end referred to as the free end and another end which opens into said tube by a connection at the same location along said tube as one or the other of the connections of the branch tube, respectively, thus forming four sections of circulation of gas entering into said tube, wherein said quarter wave tubes have the same diameter.

17. Device for attenuation of noise according to claim 9, wherein the free ends of the quarter wave tubes are connected to each other.

18. Device for attenuation of noise according to claim 10, wherein the free ends of the quarter wave tubes are connected to each other.

19. Gas conduit for a motor vehicle engine of the intake conduit type, comprising at least one device for noise attenuation according to claim 1.

20. Gas conduit for a motor vehicle engine of the intake conduit type, comprising at least one device for noise attenuation according to claim 9.

\* \* \* \* \*